United States Patent [19]

Bjorkman, Jr. et al.

[11] Patent Number: 5,556,559

[45] Date of Patent: Sep. 17, 1996

[54] BACKSIDE SHIELDING ASSEMBLY FOR PLASMA ARC WELDING

[75] Inventors: Gerald W. Bjorkman, Jr., Madison; Samuel D. Clark, Woodsville; Clinton A. Craig, deceased, late of Madison, all of Ala., by Glenice P. Craig, executrix

[73] Assignee: Lockhead Martin Corporation, Bethesda, Md.

[21] Appl. No.: 395,716

[22] Filed: Feb. 28, 1995

[51] Int. Cl.$^6$ .............................. B23K 10/00; B23K 9/16
[52] U.S. Cl. ................ 219/121.51; 219/74; 219/121.48; 219/121.45
[58] Field of Search .................... 219/121.45, 121.46, 219/121.48, 121.51, 75, 74, 136, 137 R

[56] References Cited

U.S. PATENT DOCUMENTS

| | | | |
|---|---|---|---|
| 4,562,334 | 12/1985 | Brandt | 219/74 |
| 4,866,236 | 9/1989 | De Nale et al. | 219/74 |
| 5,256,847 | 10/1993 | Aleman | 219/74 |
| 5,393,948 | 2/1995 | Bjorkman, Jr. | 219/74 |

*Primary Examiner*—Mark H. Paschall
*Attorney, Agent, or Firm*—John R. Duncan; Frank D. Gilliam

[57] ABSTRACT

A backside shield assembly for use during plasma arc welding. Two elongated closed boxes are supported in a selected spaced apart distance suitable for positioning the boxes on opposite sides of the backside of a weld line. Each box includes an inlet tube for an inert gas that generates a first side of the box and communicates with an elongated tube running along the inner surface of the first side. Perforations are provided in the elongated tubes. The balance of the interior of each box contains a flow diffusing material. The second box side, opposite the first side, is perforated. In use, the assembly is placed inside a conventional welding chill bar channel with the boxes on opposite sides of a weld line. The second surface is spaced slightly from the panel to be welded. An inert gas is directed through the inlet tubes, elongated tube perforations, diffusing material and out through the second side perforations. Since the only opening thereafter is oriented toward the volume between the boxes, the gas enters and fills that volume, where the weld flame and cooling weld bead are located. The gas covers the weld bead and prevents contamination from air borne contaminants.

10 Claims, 3 Drawing Sheets

BACKSIDE SHIELDING ASSEMBLY FOR PLASMA ARC WELDING

BACKGROUND OF THE INVENTION

This invention relates in general to welding of metals which require protection from ambient gases during welding and, more particularly, to a backside shield adapted to maintain an inert gas over the welding area during and immediately after welding.

During fusion welding of many metals, such as aluminum, aluminum-lithium, titanium, and others, gaseous elements (e.g., oxygen and nitrogen) in the ambient air will react with the molten or hot metal to form oxides and other compounds that disadvantageously affect the physical properties of the weld. It is necessary to exclude these gaseous elements from the weld area until the weld has cooled to the point where contamination can no longer occur.

In the past, this problem was overcome in welding processes such as tungsten arc welding, plasma arc welding and the like, by covering the weld area on both the front and back sides of the weld with an inert atmosphere to exclude ambient air. This could typically achieved in two ways. First, the welding head and the parts being welded can be contained in an enclosure that is filled with an inert gas during welding. While effective when welding small parts, this method is not feasible for welding very large structures, such as large aluminum-lithium space vehicle propellant tanks. In a second method for excluding gases from the weld area, the front side of the weld is shielded with the assistance of a trailing shield device and the backside of the weld is shield with a purge box mounted over the back of the weld joint.

Trailing shields are often used to cover and back side of a weld area when a highly contaminant sensitive material is being welded. These trailing shields are essentially small boxes positioned over the weld area just behind the weld torch to shield the solidifying weld puddle. Shielding gas, such as helium, argon or a mixture thereof is routed into a small box like device and diffused out onto the solidifying weld and part surface.

Backside shields or purge boxes may be used to cover the back side of the weld joint during welding. Stationary purge boxes are typically used with small structures. With large structures, the purge boxes are typically mounted so as to travel with the weld torch.

There are, however, a number of problems with these conventional box-like purge devices. Often it is necessary to inspect the weld bead as it forms and control the path of the weld torch from the back side of the weld. Automated systems, using laser sensors or television cameras, are unable to perform these tasks because the box-like device is closed to proper viewing. In addition the box design requires equipment for monitoring shield gas pressure and oxygen content inside the purge device chamber, which complicates the welding operation and increases the probability of weld defects.

Traveling shield boxes are used in many case, mounted on a carriage connected to the weld head moving mechanism so that both travel along opposite sides in alignment with the weld site as the weld site moves along the assembly being welded. In some cases, however, the weld fixtures necessary for use with certain weld setups do not provide space for such moving shield boxes.

Thus, there is a continuing need for improved devices for shielding the backside of welds against contamination from ambient air while permitting inspection of the weld as it is formed and can be used with weld fixtures that severely restrict access to the back side of the weld site and do not provide space for automatically moving a shield along the back side of the weld.

SUMMARY OF THE INVENTION

The above-noted problems, and others, are overcome in accordance with this invention by a backside shield for use in welding which basically includes a pair of elongated boxes, mounting means for maintaining the boxes in a selected parallel spaced relationship, each of said boxes including at least one inlet tube penetrating a first side of the box and communicating with an elongated perforated tube running the length of said box, diffusing material adjacent to said tube and a perforated second side.

The mounting means is preferably secured to the boxes in a manner such that the assembly of boxes fits snugly between the sides of the channel through a conventional welding chill bar. Spacer means are provided to hold the boxes slightly spaced from the panel being welded when a chill bar is placed against the backside of an area on the panel to be welded. During welding, an inert gas is passed through the inlet tubes to the perforated tubes, thence through the diffusing media and finally our through the perforated box side. Since the perforated box side is parallel to the panel being welded and the chill bar blocks gas from passing outside the shielding assembly, the gas passes to the interior space between the boxes and covers the weld area, preventing contamination of the weld.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
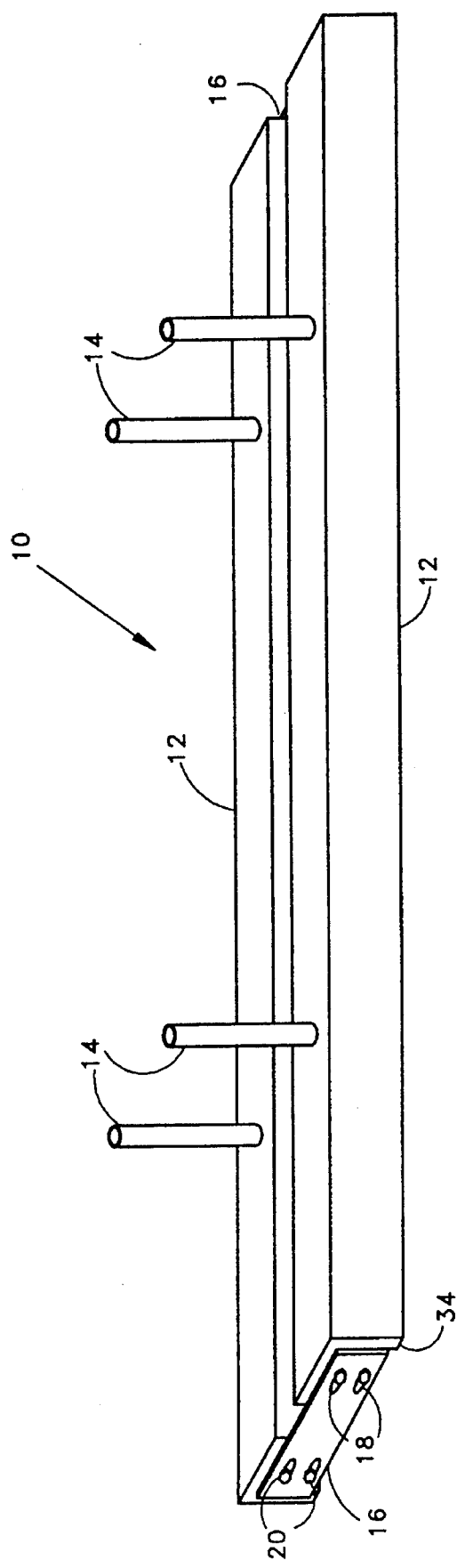
FIG. 1 is a perspective view of the backside weld shielding assembly of this invention.

As seen in FIG. 1, the backside weld shield assembly 10 includes two spaced elongated closed boxes 12. At least one tube 14 penetrates through the upper or first side of each box 12. Any suitable number of tubes 14 may be used. For long shield assemblies, two or more reasonably equally spaced tubes 14 are preferred.

Mounting plates 16 are provided across the ends of boxes 12 to hold the boxes in the desired spaced relationship. Where the shield is to be used with one particular configuration of welding system chill bar, plates 16 can be simply welded or otherwise permanently fixed to the ends of boxes 12. If the shield assembly is to be used with different chill bars, it is preferred that the connection of plates 16 to boxes 12 be made adjustable, so that the space between the boxes can be adjusted, then the plates locked in place. Any suitable adjustment means may be used. As shown, transverse slots 18 may be provided in plates 16 through which bolts 20 are threaded into the ends of boxes 12. To adjust the box spacing, the bolts are loosened, the box position set, then the bolts are retightened.

Figure 2:
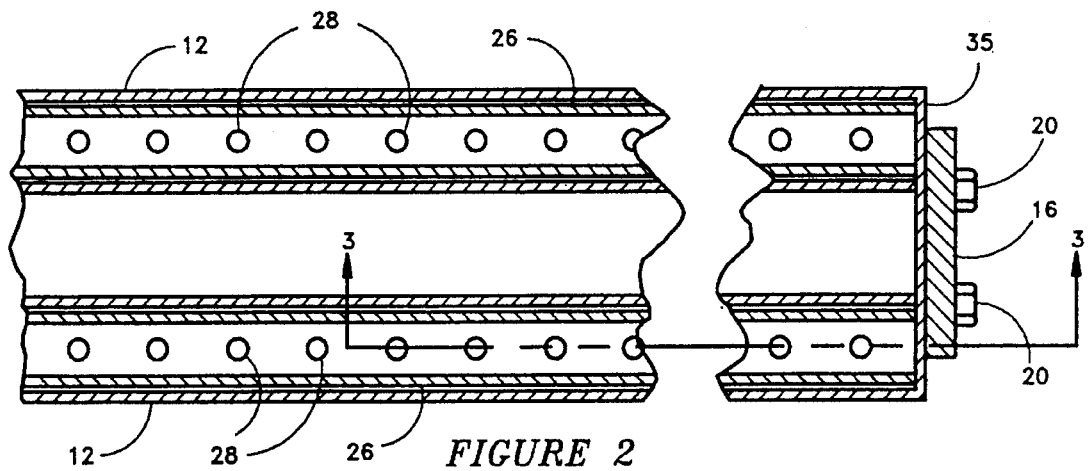
FIG. 2 is a section view of the assembly of FIG. 1 taken on line 2—2 in FIG. 3.
Figure 4:
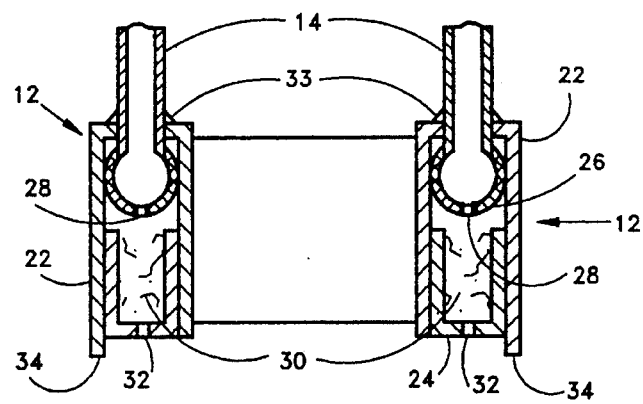
FIG. 4 is a section view of the assembly taken on line 4—4 in FIG. 3.
Figure 3:
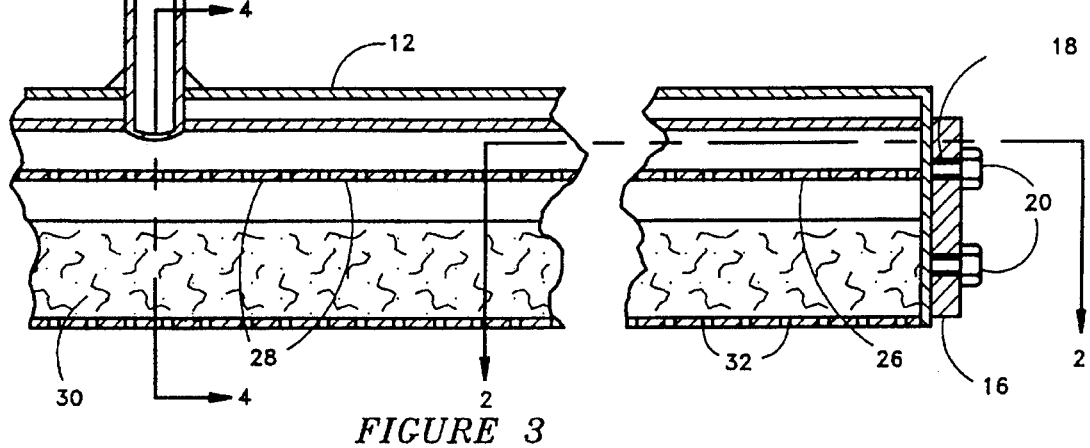
FIG. 3 is a section view of the assembly taken on line 3—3 in FIG. 2.

The internal components of boxes 12 are shown in FIGS. 2–4. An elongated, perforated tube 26 is positioned at or near the inner surface of the first side of each box 12. While the perforations 28 may be sized, spaced and arranged in an desired pattern, in general perforations in a line oriented toward the second side of the box, with a spacing of from about 0.375 to 0.750 inch and diameters of from about 0.1 to 0.125 inch are preferred.

AS seen in particular in FIG. 4, each box 12 is preferably formed from a pair of telescoping channel sections 22 and 24. Narrower channel 24 may be a friction fit within channel 22, or may be secured by any suitable means, such as welding or soldering, or screws or bolts through the sidewalls of the channels, as desired.

A quantity of fluid flow diffusing material 30 is provided between elongated tubes 26 and the second side of box 12. While any suitable diffusing material may be used, stainless steel wool is preferred for optimum performance.

A plurality of perforations 32 are provided in the second side of box 12, the base of channel 24. Any suitable number, diameter and spacing of perforations 32 may be used. Preferably, perforations 32 have diameters of about 0.03 to 0.1 inch and are provided in a square pattern located on about 0.1 to 0.125 centers.

Figure 5:
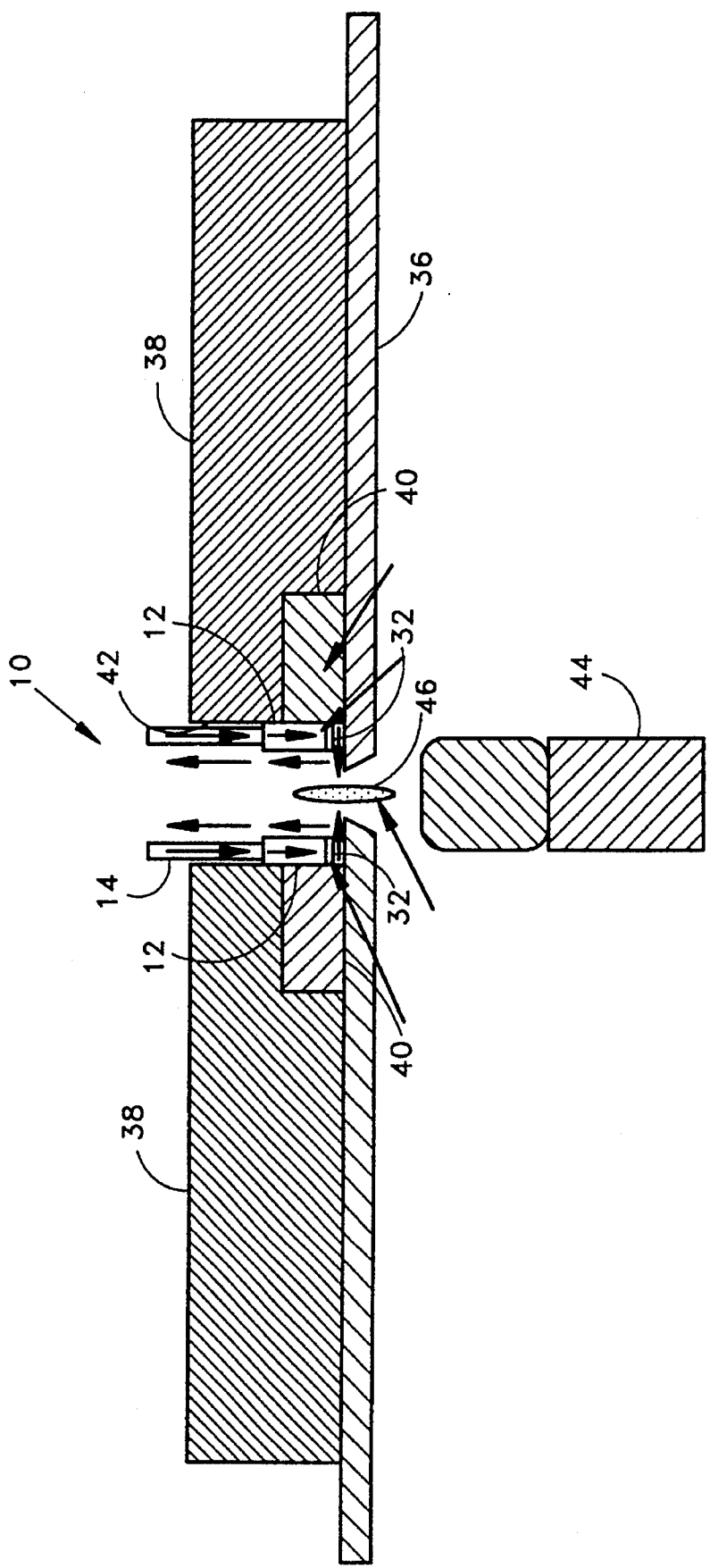
FIG. 5 is a schematic section view through a welding set-up using the shield assembly of this invention.

In use, shielding assembly 22 is placed against the backside of a panel to be welded, as seen in FIG. 5. The second side of box 12, bearing perforations 32, must be spaced slightly from the panel in order that inert gas entering through inlet tubes 14, passing through tubes 26, perforations 28 and diffusing material 30 can exit perforations 32. This spacing, typically from about 0.05 to 0.125 inch, may be provided in any suitable manner. A friction fit may be sufficient if the shield assembly is a tight fit in the chill bar. A preferred means, as seen in FIG. 4, is to provide a slightly longer outside leg 34 on channel 22. This will direct inert gas exiting perforations 32 to flow only toward the open center of the shield. Any other desired means may be used, such as welding the shield to the chill bar with the desired spacing, providing short inward shoulders on the chill bar to support the shield, small pegs extending from the perforated surface of channel 24, etc.

Typically, the shield is assembled by drilling holes in the base side of channels 22 for inlet tubes 14, extending tubes 14 through the holes and welding them around holes in elongated perforated tubes 26, then pushing tubes 26 toward the base of channels 22 and applying a weld bead 33 securing and sealing each tube 14 to channel 22, hold tubes 26 in the selected position. A quantity of diffusing material is then placed in channel 22 and/or channel 26 and channel 26 is pushed up into channel 22. As mentioned above, the two channels may be welded or bolted together, as desired. An end cover 35 can then be secured, such as by welding, to the ends of the channels. Plates 16 are then either permanently secured to end covers 35 with the two boxes 12 in the desired orientation, or the adjustable arrangement of bolts 20 and slots 18 may be installed. The shield is then ready for use.

FIG. 5 illustrates, in schematic section, the shield of this invention in use and illustrates the inert gas flow path. In a conventional plasma arc welding set-up, a panel 36 to be welded is secured to a weld fixture 38. In the arrangement schematically illustrated, the line being welded is perpendicular to the paper in FIG. 5. A chill bar 40 having an elongated central opening 42 is positioned along the weld line. The shield assembly 10 is positioned within the chill bar opening with the perforated side of the boxes 12 spaced from panel 36. Preferably, shield 10 fits reasonably snugly within the opening in chill bar 40 and weld fixture 38.

A conventional variable polarity plasma arc weld torch 44 is positioned adjacent to panel 36 with the plasma arc 46 extending into the shield assembly between boxes 12. As indicated by the arrows, an inert gas passes through inlet tubes 14, through boxes 12, out perforations 32 in the base of channel 24 and into the central area between the boxes. This floods that area with inert gas, shielding the solidifying and cooling weld from air and other potential contaminants.

The open area within shield 10 provides room for observing the weld from the backside and for video cameras or other weld monitoring devices.

While certain preferred materials, dimensions and arrangements have been described in detail in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

I claim:

1. A backside shielding assembly for plasma arc welding which comprises:

a pair of spaced elongated closed boxes;

mounting means for maintaining said boxes at a selected spaced, substantially parallel, relationship;

means for adjusting the spacing between said boxes and for locking said boxes in a position a selected distance apart;

first sides of both of said boxes lying in a first plane and second, opposite, sides of both of said boxes lying in a second plane;

at least one gas inlet tube penetrating the first side of each box;

an elongated tube within each box adjacent to said first side and in fluid flow communication with said inlet tube;

a plurality of perforations through each of said elongated tubes; and a quantity of flow diffusing material within each box;

a plurality of perforations through said second sides of said boxes.

2. The assembly according to claim 1 wherein each of said boxes comprises two elongated channel sections telescoped together.

3. The assembly according to claim 1 wherein said perforations in said elongated tubes comprise at least one row of spaced perforations oriented toward said second sides.

4. The assembly according to claim 1 wherein said diffusing material is stainless steel wool.

5. The assembly according to claim 1 further including means for supporting said boxes on a generally planar surface with said second sides in a spaced relationship from said planar surface.

6. The assembly according to claim 5 wherein said supporting means comprises an edge extending beyond said second side and second plane.

7. A backside shielding assembly for plasma arc welding which comprises:

a pair of spaced elongated closed boxes;

mounting means for maintaining said boxes at a selected spaced, substantially parallel, relationship;

means for adjusting the spacing between said boxes and for locking said boxes in a position a selected distance apart;

said boxes having spaced first and second sides with said second sides of said boxes lying in a common plane;

at least one gas inlet tube penetrating the first side of each box;

an elongated tube within each box adjacent to the inner surface of said first side and in fluid flow communication with said inlet tube;

a plurality of perforations through the sides of each of said elongated tubes oriented toward said diffusing material;

a quantity of flow diffusing material within each box;

a plurality of perforations through said second sides of each box; and means for supporting said boxes on a generally planar surface with said second sides in a spaced relationship from said planar surface.

8. The assembly according to claim 7 wherein each of said boxes comprise two elongated channel sections telescoped together.

9. The assembly according to claim 7 wherein said diffusing material is stainless steel wool.

10. The assembly according to claim 7 wherein said supporting means comprises an outer raised edge on said second side.

* * * * *